United States Patent Office 3,312,057
Patented Apr. 4, 1967

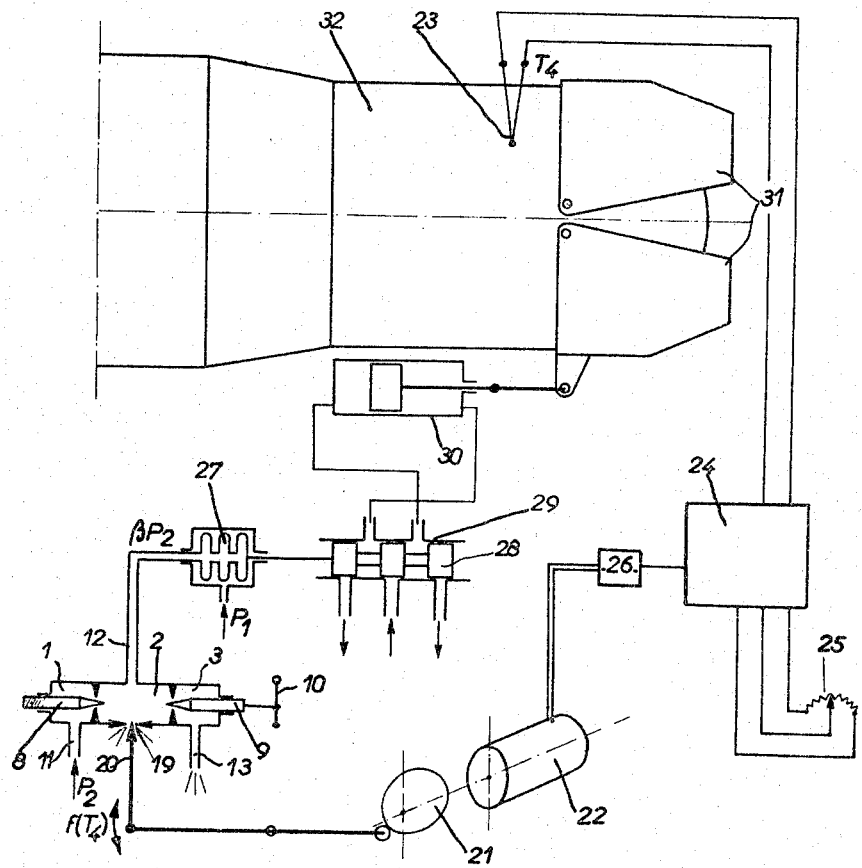
Fig.: 3
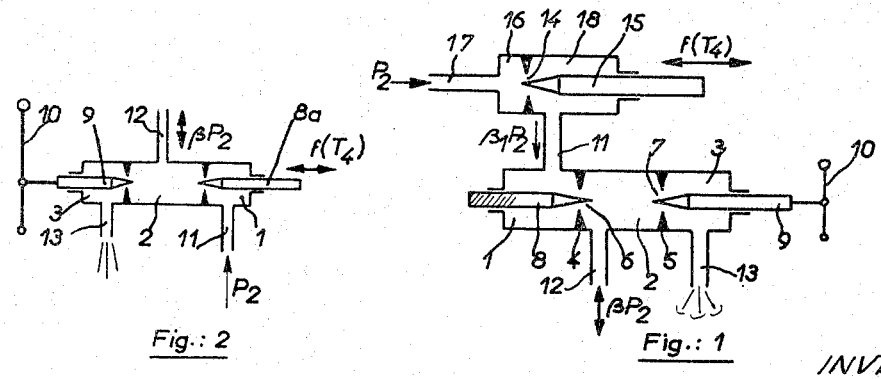
Fig.: 2    Fig.: 1
INVENTORS
Albert Stieglitz
Roger Henri Tissier
Michel Paul Baliquet
By Stevens Davis Miller & Mosher
Attorneys

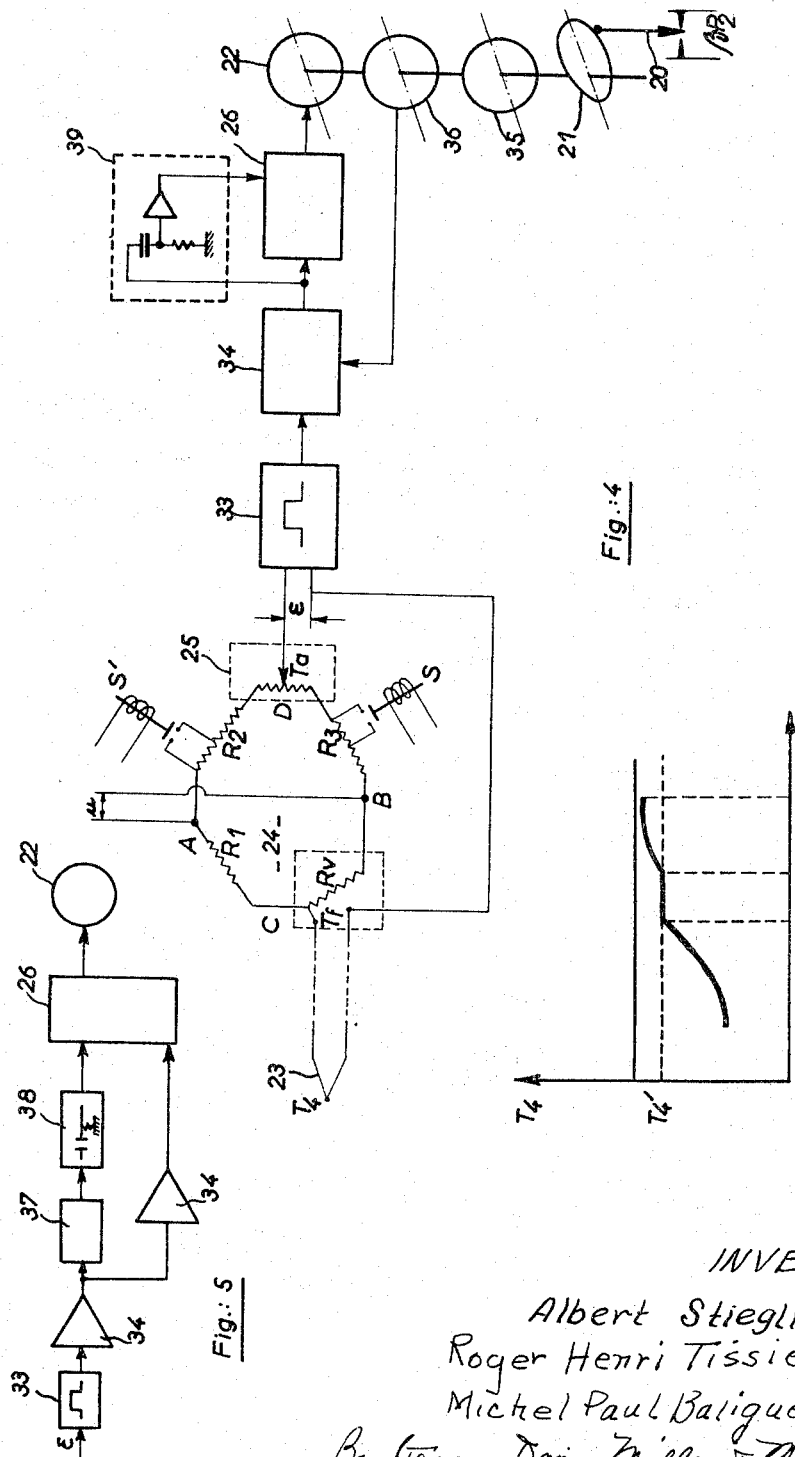

3,312,057
REGULATOR DEVICE FOR GAS-TURBINE
ENGINES AND LIKE ROTARY UNITS
Roger Henri Tissier, Paris, Michel Paul Baliguet, Suresnes, and Albert Stieglitz, Seine-et-Marne, France, assignors to Societe Nationale d'Etude et de Construction de Moteurs d'Aviation, Paris, France, a company of France
Filed Nov. 27, 1964, Ser. No. 414,083
Claims priority, application France, Nov. 29, 1963, 955,528
9 Claims. (Cl. 60—39.24)

This invention relates to the protection and possible regulation of turbine engines, the latter-mentioned term encompassing all gas turbine engines, be they airplane or helicopter turbojet or turboprop engines, or marine or industrial-type turbines.

The regulating function may involve a continuous correction or a correction for limitation to a maximum value. It is alternatively possible to effect a total regulation based on the same principle, which would then provide the principal function.

In all cases the parameter will be the effective temperature in the jet pipe (or any other appropriate point in the engine), and the object will be to obviate any risk of overheating while permiting a substantial reduction of the temperature tolerances and, all other things being equal, consequent operation at higher temperature and hence with improved efficiency.

Generally speaking, limitation only to the maximum allowable temperature must be regarded simply as a specific case of utilization as a corrector (for in such cases the reference signal will be unique instead of being variable).

Application as a straightforward corrector may be made by modifying the action of the pre-existing governing means of the turbine engine.

In the case of turbojets, the apparatus may operate on the fuel flow rate if the jet pipe section is fixed, or on the jet pipe section if the latter is of the variable-geometry type, or better still on the afterburner fuel flow rate and possibly also on the compressor(s) relief valves.

In the case of airplane or helicopter turboprops, it will be of advantage to modify the propeller blade pitch or the fuel flow rate.

The subject apparatus of this invention may also be used to reguate the operating conditions of nuclear reactors used to power turbines. However, it will invariably be possible to render the apparatus inoperative by means of an ordinary contactor, for example, either in order to prevent a possible incident or to permit an overload of short duration.

Total regulation based on this apparatus can be obtained by completely referencing one of the engine components to it, the tachometer-governor system and the other parameters being utilized for the remaining controls.

The pilot may, for instance, set up a determinate speed and the apparatus will adapt engine operation to the temperature; conversely, the tachometer-governor system may be used to maintain the normal speed, with the pilot determining engine operating conditions according to the temperature by operating on the blade pitch, the fuel flow rate, the jet pipe section, or the inlet vanes.

The correction means as a function of true temperature can be associated to a previously existing engine governing system, it being possible for the correcting means to be rendered inoperative by the pilot if necessary, for instance by means of an ordinary contactor.

In the interests of simplification, chief consideration will be given to application of the invention to a turbojet with a variable-geometry exhaust nozzle and possibly also to a few applications to a turboprop.

It is known that the thrust of a jet engine is expressed by the momentum of the gas ejected through the nozzle in unit time, that is to say by the product of the gas mass flow times the gas ejection velocity. For a given jet engine, the mass flow of gas will depend essentially upon the compressor rotation speed, while the ejection velocity will depend upon the gas temperature and the gas outlet section through the nozzle.

Similarly, the power of a turboprop can be expressed by the momentum of the air thrust back by the propeller, i.e. as a function of the blade pitch.

It is also known that, for a given load on a jet engine, the governing system thereof adjusts the rotation speed and the nozzle section or blade pitch in order to obtain the thrust or power corresponding to the position of the pilot's throttle-lever, although it will be appreciated that this is effected within limits compatible with satisfactory engine operation.

Due, however, to the many variables affecting overall efficiency (aircraft speed, flight altitude, efficiency of the different stages, combustion efficiency, fidelity of the various regulator components, etc.), a certain degree of dispersion is found in the results, whence the need to allow fairly large safety margins (especially in regard to the nozzle and turbine temperature) in order to avoid accidental local overheating and obviate any risk of compressor stalling.

By effecting a continuous correction as a function of the temperature, for example, the present invention permits functional "repeatability," i.e. the obtainment of virtually identical partial or total loads for all throttle-lever positions under given flight conditions, and also the achievement of optimum operating conditions by coming as close as possible to the maximum allowable temperatures level with the turbine and along the jet pipe.

According to the present invention, this correction and the attendant results referred to hereinabove are obtained by sensing the temperature at an appropriate point along the jet pipe and by applying the signal obtained thereby to correct, say, the fuel flow rate and the nozzle outlet section or the blade pitch for each position of the throttle lever.

More specifically, if the nozzle section is controlled by a known servomechanism activated by a pressure-sensitive capsule responsive to a pressure differential $\beta P_2 - P_1$, where $P_1$ and $P_2$ are the compressor entry and exit pressures and $\beta$ a pressure reduction coefficient less than unity, the desired correction may be effected by operating on the coefficient $\beta$ in order to automatically modify said pressure differential as a function of the temperature.

In a preferred form of embodiment of the present invention, such operation on the coefficient $\beta$ is effected by utilizing a pressure drop produced by a leak through a restrictor that is variable as a function of the temperature and which is mounted in series or in parallel with the customary pressure-reducer adjustment restrictor.

By the same token, it is possible to modify the feed to the rams governing the blade pitch of an airplane or helicopter turboprop.

In the case of industrial-type turbines, a similar method may be used for operating either on the fuel flow, on the compressor(s) relief valves, or on such hot gas relieving means, as the inlet nozzle ring of a free turbine, etc.

In the case of nuclear reactors, the correcting means of the turbine inlet temperatures can affect only the reactor operating conditions and must therefore be connected into the reactor regulating channel in such manner that, though serving as the main turbine governing means, it delivers only an error signal to the reactor loop.

The description which follows with reference to the accompanying non-limitative exemplary drawings will give a clear understanding of how the invention can be carried into practice.

In the drawings:

FIGURE 1 is a schematic longitudinal sectional view of a form of embodiment of a temperature-sensitive pressure reducer according to the invention;

FIGURE 2 is a corresponding view of an alternative embodiment;

FIGURE 3 shows another constructional form of a pressure reducer according to the invention and its disposition within a regulating system;

FIGURE 4 is a block diagram of a circuitry for controlling the auxiliary restrictor as a function of the temperature;

FIGURE 5 is an alternative embodiment of this circuitry;

FIGURE 8 is an explanatory curve; and

Figure 6:
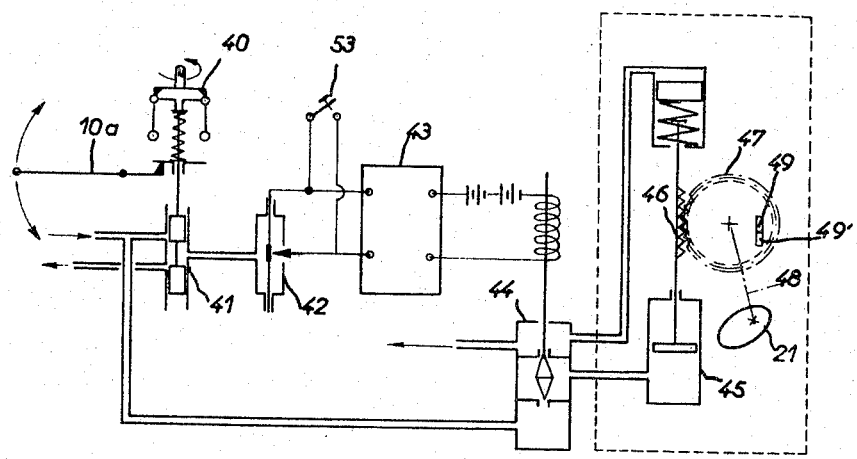
FIGURE 6 is a diagrammatic view of the system used to render the correcting system inoperative.

Referring first to FIGURE 1, the pressure reducer of known type shown thereon consists of three successive compartments 1, 2, 3 separated by transverse partitions 4, 5 having formed therein openings 6, 7 of adjustable section. This adjustable section is obtained by means of axially movable conical needles 8, 9 engaging in said openings. The first needle 8 is used for a preliminary adjustment and the second needle 9 for "modulating" the pressure in response to the throttle lever 10. A pressure inlet pipe 11 is connected to a port in the first compartment 1. A reduced pressure takeoff pipe 12 is connected to a port in the second chamber 2. The third compartment 3 has, connected to a port therein, a leak pipe 13 which is either vented to the atmosphere or connected to the intake of a vacuum pump.

According to the present invention, a restrictor 14 adjusted by a needle 15 is arranged in series with said known pressure reducer. The needle 15 is moved as a function of the temperature T4 detected at a given point on the turbojet nozzle by means which will be described hereinafter. The adjustable restrictor 14 interconnects, on the one hand, a compartment 16 which receives through a pipe 17 the pressure $P_2$ sensed on the exit side of the compressor, and, on the other hand, a compartment 18 which communicates through the pipe 11 with the inlet compartment 1 of said known pressure reducer.

The pressure $P_2$ thus undergoes at 14 a first reduction to an intermediate pressure $\beta_1 P_2$, where $\beta_1$ is a reduction coefficient equal to $f(T4)$. This intermediate pressure prevailing in the compartment 18 is communicated through the interconnecting passage 11 to the compartment 1 and undergoes a further reduction $\beta_2$ dependent upon the setting of needle 8 and the position of the throttle lever 10. The pressure obtained in the central compartment 2 is therefore $\beta P_2$, where $\beta = \beta_1 \cdot \beta_2 = f(T4) \cdot \beta_2$.

Instead of being in series with the customary pressure-reducer restrictor, the restrictor which is adjustable as a function of T4 may be in parallel therewith, as shown in FIGURE 2. The pressure-matching needle 8 used for preliminary adjustment is here replaced by a needle 8a responsive to the temperature T4, as in the case of the needle 15 in the form of embodiment described precedingly. In other words, the matching process is here variable with the temperature T4.

Alternatively, the matching needle 8 may be retained and provision made in the central compartment 2 of the pressure reducer for an auxiliary bleed 19 controlled by a needle 20, as is clearly shown in FIGURE 3. This needle is moved under the action of a servo-mechanism as a function of the temperature T4.

In the constructional form shown in FIGURE 3, the bleed 19 from the central compartment 2 is controlled by the rotation of a cam 21 keyed to the rotor shaft of a servo-motor 22, and the angular position of this cam is determined by the temperature T4 measured by means of a thermocouple 23 positioned in the turbojet nozzle 32. The voltage generated by this thermocouple, which is a function of the temperature T4, is applied to a comparator 24 to which is also applied a reference voltage which is previously adjusted by setting input potentiometer 25. The error voltage amplified at 26 energizes the electric servo-motor 22, the shaft of which, rotating in one direction or the other, operates through the cam 21 to move the leakage needle 20 as a function of T4, thereby modifying the value of $\beta$.

If it is merely desired to limit the temperature to its maximum value, it will suffice to define a fixed reference voltage rather than a variable reference voltage determined by a potentiometer, in which case the control element may be a device operating on the on/off principle, an example being an electrovalve.

Clearly, a similar arrangement could be used for controlling the needle 15 (FIGURE 1) and 8a (FIGURE 2) as a function of the temperature T4.

In all cases, however, the reducer output pressure $\beta P_2$ will be used in the usual way for governing the engine. In the specific example of FIGURE 3, this reduced pressure is applied to the interior of capsules 27 subjected externally to the engine compressor inlet pressure $P_1$. The pressure differential $\beta P_2 - P_1$ determines the position of the slide 28 of a slide-valve 29 feeding the hydraulic rams 30, which rams in this case control the clams 31 for adjusting the outlet section of the jet engine nozzle 32.

If, for example, the temperature T4 exceeds the reference temperature, then the bleed 19 decreases and $\beta$ increases, thus expanding the servo-mechanism capsules 27 and moving the slide 28 of slide-valve 29 in the direction required to open the nozzle clams 31 to a greater extent. This causes the counter-pressure to the turbine to decrease and the engine rotor speed to increase. This increased speed is countered by the speed regulator which partially constricts the fuel metering device and thus reduces the amount of fuel injected, thereby causing the temperature to drop. The resulting pressure drop in turn lowers the rotation speed, resulting in a reverting to the original preset speed.

In the case of a turboprop, an overstepping of the temperature would correspond to an overpower condition. This would require reducing the blade pitch, and the speed regulator would reduce the fuel feed rate in order to maintain the speed at its nominal value.

The temperature signal generated by the thermocouples as at 23 may be compared to a reference temperature by utilizing a bridge arrangement, as shown in FIGURE 4. This bridge is fed across A and B by a constant voltage $u$. One of the branches BC of the bridge contains a resistor $R_v$ positioned in the same thermal chamber as the reference point of the thermocouple. This resistor is variable as a function of the temperature and serves as compensation for the thermo-junction. The initial setting is introduced, say, through the potentiometer 25. Two switchable resistors $R_2$ and $R_3$ enable the value of the initial setting, i.e. of the permissible temperature T4, to be changed.

The voltage issuing from the thermocouple 23 is opposed to the voltage setting set in by the potentiometer 25. The resulting error signal $\epsilon$ is applied to the input of amplifier 26, subsequent to chopping at 33 and preamplification at 34, and controls rotation of the motor 22 in one direction or the other, depending on the sign of the error. On the one hand, this motor drives, through a reduction gear 35, the cam 21 controlling the needle 20 (or 15 or 8a) of the pressure reducer whereby to modify $\beta$, and, on the other hand, a dynamo 36 which applies a damping signal to the preamplifier 34.

Should the pilot desire to resort to overpower artifices such as may be obtained by overspeeding or overheating, he cannot use the throttle lever since the latter is against its maximum stop. However, he may resort to either of these operations by switching in either of relays S or S', thus modifying resistor $R_3$ or $R_2$ and, as a result, preset reference value $Ta$. The level of the temperature T4 can thus be changed to the values required to permit such transient acceleration artifices.

It is to be noted, however, that heat is not transmitted through a thermocouple instantaneously, but that a delay occurs between the change in the actual temperature and the change in the temperature indicated by the thermocouples. The alegbraic sign of this time-delay will depend on the sense in which the temperature is modified. Hence, since the thermocouples do not furnish their signal without a certain time lag, the error $\epsilon$ will not be representative of the true conditions, so that the corrector, instead of responding as soon as the preset temperature is reached, will react while the temperature is in the process of rising and the actual temperature has exceeded this preset value. In the case, say, of a sudden movement of the throttle lever from the idling setting to the full-throttle setting, this will result in the preset value T4 being exceeded by a more or less large margin.

In order to reduce this overshoot, one solution consists in adding to the proportional signal in the circuit a signal differentiated as shown in the block diagram of FIGURE 5, in which reference numeral 37 designates a demodulator and numeral 38 a differentiating unit. Such an arrangement very markedly reduces temperature overshoots.

This notwithstanding, in the event of a very sudden acceleration, the fuel injected will cause a rapid temperature rise, and even slight overheating, due to the fact that the nozzle follows up slowly. In such cases it may be advantageous to override the corrector, as shown in FIGURE 4, with an anti-overshoot device 39.

In the case of a rapid variation of the temperature T4 and hence of the error $\epsilon$, $d\epsilon/dt$ will be very large, and the overheating can be reduced by gating the amplifier 26 for a time $t$ by means of a signal proportional to $d\epsilon/dt$. As a result, the order will not be transmitted to the pressure reducer instantaneously, and overheating will be slight. The time required for the modified thrust to establish itself will be little affected.

As FIGURE 6 shows, the present invention likewise relates to an alternative anti-overshoot device which is entirely independent of the T4 correcting system.

In this form of embodiment, the pilot's acceleration input signal via the throttle lever 10a results in an oil overpressure being established, through the agency, say, of the engine tachometer governor 40, from the slide-valve 41. This overpressure operates a pressure switch 42 which switches in a relay 43 the time-delay characteristic of which is chosen as a function of the duration of an acceleration phase. This relay opens an electro-valve 44 which feeds a ram 45 for rendering the T4 corrector inoperative. Through a rack 46 this ram drives a pinion 47 carrying a peg 49 against which abuts another peg 49' rigid with the shaft 48, the angular travel of which, and hence of the cam 21, is thereby restricted.

In normal operation the shaft 48 can drive the pinion, rack and ram piston freely, but by communicating pressure into the ram 45 the reducer needle controlled by the cam 21 can be returned to a midway position, thereby cancelling any action by the T4 corrector.

Figure 7:
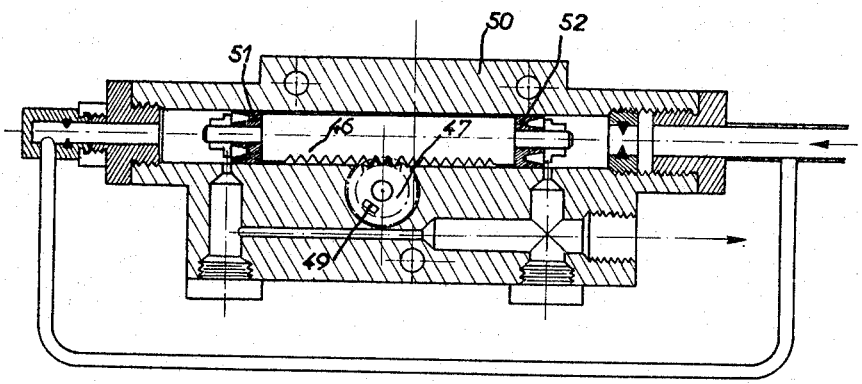
FIGURE 7 is a longitudinal section of a construction detail.

As shown in FIGURE 7, the peg 49 may be provided on the pinion 47 meshing with the rack 46 which slides through its housing 50. This rack is held stationary in a midway position between two pistons 51, 52 as soon as the electrovalve 44 of FIGURE 6 is opened.

The bleed at the pressure reducer will thus be of constant value and the engine will respond solely to the tachometer governor.

There are several advantages to this arrangement, the main ones being the following:

(1) Accelerations are absolutely independent of the time constants, the thermocouples and the entire correcting system, thereby enabling even industrial-type thermocouples to be used.

(2) The faculty, by judiciously selecting the relay time-delay, of accelerating, in accordance with the curve drawn in a solid heavy line in FIGURE 8, up to a temperature T'4, the time-delay $t_2-t_1$ initially enabling the temperature of the thermocouples to be stabilized and the T4 corrector to be subsequently used oved the period $t_3-t_2$ for the final correction between T'4 and the desired T4 value (see horizontal solid line in FIGURE 8).

It will thus readily be appreciated that the overheating involved will be very small and of very short duration and that the modified geometry of the nozzle outlet section will protect the engine up to the ultimate stage when the T4 corrector becomes operative to complete the temperature adapting function. It will therefore suffice to select an appropriate time constant for the T4 corrector system as a whole (including the thermocouples) to obtain a damping process such that the temperature can in no case exceed the maximum allowable values.

(3) The fact that the entire system can be rendered inoperative instantly in the event of a failure of one of the corrector elements, or should the pilot so desire, by merely closing a contactor 53 (see FIGURE 6).

(4) The corrector can be rendered inoperative during acceleration periods.

Figure 9:
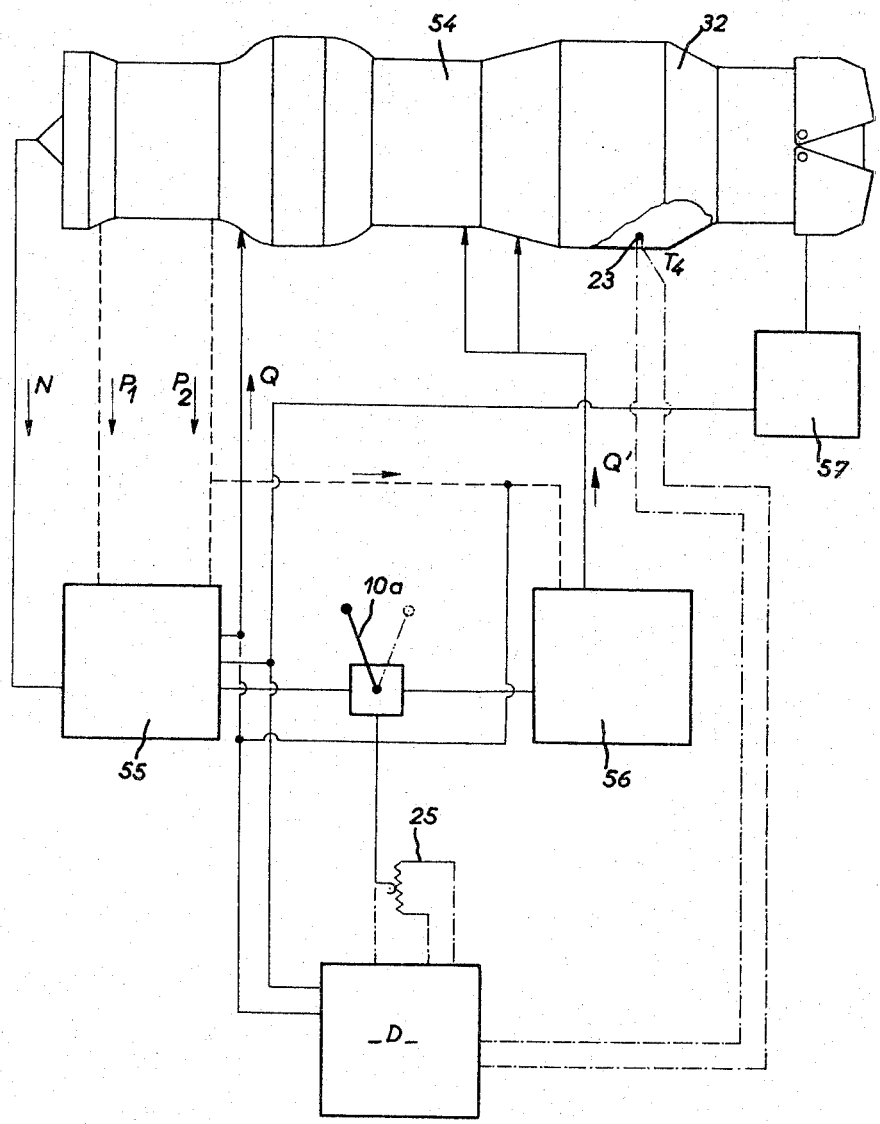
FIGURE 9 is a highly diagrammatic overall view of a turbojet with its temperature-correction regulating system according to the invention.

FIGURE 9 shows a turbine engine 54 in which, beside the main regulator 55 and the afterburner regulator 56, there is provided a device D for correction as a function of the temperature T4 sensed in the nozzle 32. The pilot's control 10a—or a device referenced to the rotor speed—operates on the setting potentiometer 25 at the same time as on the regulators.

This device governs a turbojet exhaust nozzle servo-control 57 as described precedingly, though it will of course be understood that it would also be possible to operate on the fuel flows Q and Q' to the main and afterburner injectors.

What is claimed is:

1. A regulator device for gas-turbine engines and like rotary units already having a normal control system responsive to selected parameters and comprising a servo-control responsive to a differential pressure of the form $\beta P_2 - P_1$ in which $P_1$ and $P_2$ are respectively the compressor intake and discharge pressures and $\beta$ is an adjustable pressure reduction coefficient, said regulator device comprising means for continuously detecting gas temperature at a point of the flow path through the engine and for continuously producing a thermometric signal which depends on the detected temperature, and means for applying said thermometric signal as an auxiliary parameter to said control system for modifying said adjustable pressure reduction coefficient, whereby said control system is responsive to said selected parameters supplemented by said detected temperature.

2. A device as claimed in claim 1, wherein the control system comprises a chamber, pressure intake means communicating with said chamber through a variable restriction adapted to cause an adjustable pressure drop, and pressure output means leading from said chamber to the servo-control.

3. A device as claimed in claim 2, wherein the pressure intake means supply a pressure $P_2$ and the restriction is varied in accordance with the thermometric signal.

4. A device as claimed in claim 2, wherein the control system comprises a further variable restriction adapted to cause an adjustable pressure drop, and means responsive to the thermometric signal for varying said further restriction.

5. A device as claimed in claim 4, wherein said further variable restriction is positioned in the pressure intake means upstream of the former variable restriction and operates in series therewith.

6. A device as claimed in claim 4, wherein said further variable restriction is positioned on a wall of the chamber and operates in parallel with the former variable restriction.

7. A device as claimed in claim 4, comprising an adjustable member for varying the restriction, a cam for actuating said member, and a servo-control motor for driving said cam in response to the thermometric signal applied thereto.

8. A device as claimed in claim 1, wherein the temperature detector transmits a voltage signal which is compared with a reference voltage supplied by a potentiometer, the resulting deviation voltage being applied as thermometric signal.

9. A device as claimed in claim 8, wherein the potentiometer is associated with at least one short-circuitable resistor.

References Cited by the Examiner

UNITED STATES PATENTS

| | | | |
|---|---|---|---|
| 2,668,416 | 2/1954 | Lee | 60—39.28 |
| 2,669,094 | 2/1954 | Lee | 60—39.28 |
| 2,690,647 | 10/1954 | Woodward | 60—35.6 |
| 2,939,280 | 6/1960 | Farkas | 60—39.28 |
| 2,941,354 | 6/1960 | Sobey | 60—35.6 |
| 2,971,326 | 2/1961 | Peters et al. | 60—35.6 |
| 3,063,243 | 11/1962 | Bancroft et al. | 60—39.28 |

JULIUS E. WEST, *Primary Examiner.*